United States Patent [19]

Grandi

[11] Patent Number: 4,459,831
[45] Date of Patent: Jul. 17, 1984

[54] APPARATUS FOR PREVENTING A CONTAMINATION OF THE AMBIENT AIR DURING AN EMPTYING AND CLEANING OF THE DISTILLATION VESSEL OF DRY CLEANING APPARATUS

[75] Inventor: Vittorio Grandi, S. Giorgio Di Piano, Italy

[73] Assignee: Multimatic-Maschinen GmbH. & Co., Melle, Fed. Rep. of Germany

[21] Appl. No.: 388,585

[22] Filed: Jun. 15, 1982

[30] Foreign Application Priority Data

Jun. 16, 1981 [DE] Fed. Rep. of Germany ....... 3123792

[51] Int. Cl.³ .............................................. D06F 43/08
[52] U.S. Cl. .................................................... 68/18 R
[58] Field of Search .................. 68/18 R, 18 C, 18 F; 34/77; 202/201, 206; 203/1, 49; 8/142, 158

[56] References Cited

U.S. PATENT DOCUMENTS

| 2,964,934 | 12/1960 | Shields ............................. 68/18 R |
| 3,270,530 | 9/1966 | Czech ............................... 68/18 R |
| 3,306,083 | 2/1967 | Lorintzo ........................... 68/18 R |
| 3,978,694 | 9/1976 | Hughes et al. .................... 68/18 R |
| 3,990,273 | 11/1976 | Scholten et al. ................. 68/18 R |

FOREIGN PATENT DOCUMENTS 2410072 7/1976 France ............................... 68/18 R Primary Examiner—Philip R. Coe
Attorney, Agent, or Firm—Fleit, Jacobson, Cohn & Price

[57] ABSTRACT

A mixture of air and solvent vapor is sucked from a distillation vessel before or while the door closing the discharge opening of the distillation vessel is opened and the mixture is purified and then exhausted as exhaust air. In the apparatus, the distillation vessel is connected by conduits and controllable valves to the drying fan, by which the solvent-containing air that has been sucked is exhausted into the open through a purifying and/or recovering system.

7 Claims, 2 Drawing Figures

4,459,831

APPARATUS FOR PREVENTING A CONTAMINATION OF THE AMBIENT AIR DURING AN EMPTYING AND CLEANING OF THE DISTILLATION VESSEL OF DRY CLEANING APPARATUS

SUMMARY OF THE INVENTION

This invention relates to an apparatus for preventing a contamination of the ambient air during discharge and cleaning of the distillation vessel of dry cleaning apparatus.

In dry cleaning apparatus, the solvent, such as perchloroethylene, must be purified by distillation in regular intervals of time so that the full cleaning power of the solvent is restored and a soiling of the clothes by the laden solvent will be prevented. When the distillation vessel is opened for the removal of the distillation residue after the distillation has been completed, solvent vapor will inevitably escape from the vessel and will exert detrimental influences on the operators. The permissible maximum working site concentrations are often exceeded when the distillation residues are removed from the distillation vessel.

For this reason it is an object of the invention to provide an apparatus by which an ingress of solvent vapor into the ambient air can be prevented during the discharge of the distillation vessel.

This object is accomplished according to the invention in that the mixture of air and solvent vapor is sucked from the distillation vessel before or while the door closing the discharge opening of the distillation vessel is opened and said mixture is purified and then exhausted as exhaust air. Ambient air is sucked into the distillation column through the door as the latter is opened so that air which contains solvent vapor cannot escape through that door.

The invention provides also an apparatus in which the distillation vessel is connected by conduits and controllable valves to the drying fan, by which the solvent-containing air that has been sucked is exhausted into the open through a purifying and/or recovering system. The apparatus can be used in a simple manner and with equipment which is usually available in dry cleaning apparatus if the existing drying fan is connected to the distillation vessel by change-over valves, such as hinged valves, so that the fan sucks from the distillation vessel the air which contains solvent vapor and blows that air through a succeeding purifying and/or recovering system.

The distillation vessel may be connected to the drying fan directly or via an air cooler so that solvents may be recovered also in the drying fan.

The hinged or other valves in the conduits by which the distillation vessel is connected to the drying fan and the hinged or other valves in the conduit by which the drying fan is connected to the purifying and/or recovering system and also the means for driving the drying fan are controlled by a switch, which may be adapted to be actuated by the means for locking the door for closing the discharge opening or by said door.

BRIEF DESCRIPTION OF THE DRAWINGS

An illustrative embodiment of the invention will now be explained more fully with reference to the drawing, in which.

DETAILED DESCRIPTION OF THE DRAWINGS

Figure 1:
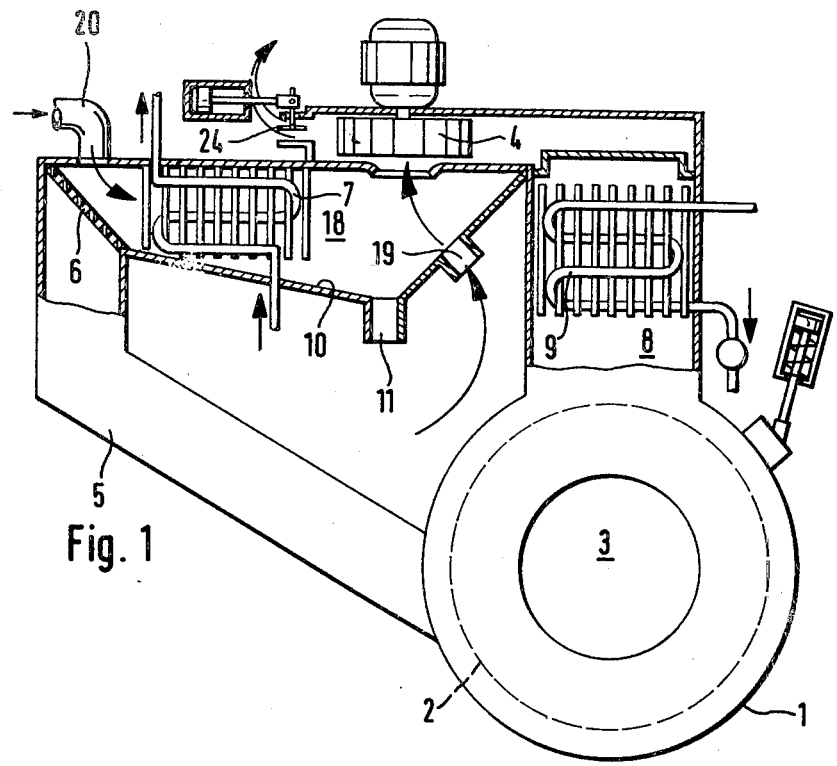
FIG. 1 is a diagrammtic representation of the drying circuit of a dry cleaning apparatus and FIG. 2 is a diagrammatic view showing the distillation vessel of a dry cleaing apparatus as shown in FIG. 1.
Figure 2:
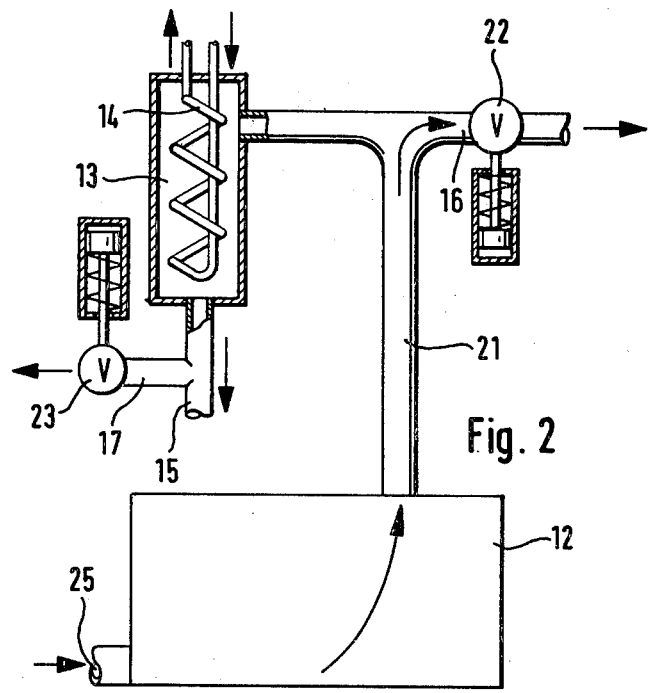

A cleaning drum 2 indicated by dotted lines is rotatably mounted in a drum-shaped housing 1. The clothes are introduced into and removed from said cleaning drum 2 through an opening 3, which is adpated to be closed, and are dried in the drum 2 when the cleaning operation has been completed.

When the solvent has been drained from the drum 2 and the clothes have been spin-dried in the drum 2, the clothes are further dried in a drying air stream. For this purpose, the fan 4 sucks air from the housing 1 through the suction conduit 5. The sucked drying air flows through a lint filter 6 into the air cooler 7 and is then blown by the fan 4 back into the housing 1 for the cleaning drum 2 through a conduit 8, which incorporates an air heater 9.

Solvent which has condensed in the air cooler 7 is collected on the bottom 10 of the funnel-shaped collecting tub and flows through the pipe 11 into a water separator. The dry cleaning apparatus described thus far is of known design.

To purify the solvent, the latter is charged in regular intervals of time into the distillation vessel 12 and is heated therein to form solvent vapor, which is then liquefied, e.g., in the condenser 13, which is provided with cooling coils 14. The solvent then flows through the pipe 15 to the water separator and subsequently into the reservoir for pure solvent.

In accordance with the invention, conduits 16 and 17 are respectively connected by the connecting pipe 19 to the space 18 below the drying fan and by the connecting pipe 20 to the interior of the air cooler 7. The conduit 16 is directly connected to the conduit 21, which comes from the distillation vessel. The conduit 17 is connected to the outlet of the condenser 13. The conduits 16 and 17 incorporate the controllable valves 22 and 23, respectively.

The pressure side of the fan 4 is connected by the controllable hinged valve 24 to a conduit leading to a purifying and/or recovering system.

The hinged or other valves 22, 23, 24 are operable by solenoids or by hydraulic or pneumatic cylinders.

When the distilling operation has been completed, and a door, not shown, for closing the discharge opening 25 of the distillation vessel, is opened, the motor for driving the fan is automatically started and the hinged or other valves 22, 23, 24 are actuated so that the fan 4 sucks air which contains solvent vapor through the opening 25 and discharges said air through the recovering and/or purifying system.

The valves and the fan drive motor can be started by a separate switch, the actuating means of which may be operatively connected to the door of the distillation vessel or to the means for locking said door.

What is claimed is:

1. An apparatus for preventing contamination of ambient air during discharge and cleaning of a distillation vessel of a dry cleaning machine with a drying fan for sucking solvent-containing air, said apparatus comprising:

a plurality of conduits connected at a first end to said distillation vessel through which said solvent-containing air is sucked, said conduits connected at a second end to said fan;

a plurality of valves, each located in a particular one of said plurality of conduits for initiating the flow of said solvent-containing air from said distillation vessel through said conduits; and exhaust means for purifying said solvent-containing air sucked through said conduits by said fan.

2. An apparatus as claimed in claim 1, wherein said fan is disposed between said second end of said conduits and said exhaust means.

3. An apparatus as claimed in claim 2, wherein one of said plurality of conduits is connected at a second end to a suction side of said fan.

4. An apparatus as claimed in claim 3, further comprising an air cooler located near said suction side of said fan for cooling said solvent-containing air.

5. An apparatus as claimed in claim 4, wherein said apparatus further comprises a switching means for opening said plurality of valves on said conduits and opening a valve for said fan to suck said mixture into said exhaust means.

6. An apparatus as claimed in claim 5, said apparatus further comprising a discharge opening of said distillation vessel activating said switching means when said discharge opening is opened.

7. An apparatus for preventing contamination of ambient air during discharge and cleaning through a discharge opening of a distillation vessel of a dry cleaning machine, said distillation vessel purifying a solvent received from a collecting tube collecting solvent condensed at an air cooler receiving an air-solvent mixture sucked through a filter by a fan from a dry cleaning drum, said apparatus comprising:

at least two conduits connecting the distillation vessel and an area subject to the pull of a fan, an exhaust means for purifying and recovering solvent from an air-solvent mixture, a valve for each of the conduits and the exhaust means, and a switch activated by opening a discharge opening of said distillation vessel, said switch activating the opening of the valves of the conduits and the exhaust means and starting the fan whereby said air-solvent mixture is sucked through the conduits from the distillation vessel upon the opening of said discharge opening.

* * * * *